(12) United States Patent
Wee et al.

(10) Patent No.: US 8,364,523 B2
(45) Date of Patent: Jan. 29, 2013

(54) METHOD AND SYSTEM FOR RECOMMENDING ADVERTISEMENT KEYWORD ACCORDING TO KEYWORD RECOMMENDATION STANDARD

(75) Inventors: Wu Sic Wee, Gyeonggi-do (KR); Minuk Kim, Seoul (KR); Byounghak Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 486 days.

(21) Appl. No.: 12/107,749

(22) Filed: Apr. 22, 2008

(65) Prior Publication Data

US 2008/0270167 A1    Oct. 30, 2008

(30) Foreign Application Priority Data

Apr. 26, 2007    (KR) .................. 10-2007-0040788

(51) Int. Cl.
*G06Q 40/00*    (2012.01)
(52) U.S. Cl. .............. 705/14; 705/26; 707/3; 707/4; 707/103
(58) Field of Classification Search ............ 705/14, 705/14.42, 14.4–14.73, 15–45; 707/706–788
See application file for complete search history.

(56) References Cited

U.S. PATENT DOCUMENTS

| | | | |
|---|---|---|---|
| 2005/0065844 A1* | 3/2005 | Raj et al. ...................... | 705/14 |
| 2005/0198068 A1* | 9/2005 | Mukherjee et al. ......... | 707/104.1 |
| 2006/0004734 A1* | 1/2006 | Malkin et al. ................ | 707/4 |
| 2006/0004850 A1* | 1/2006 | Chowdhury ................ | 707/103 R |
| 2006/0010105 A1* | 1/2006 | Sarukkai et al. ............. | 707/3 |
| 2007/0143176 A1* | 6/2007 | Nong et al. .................. | 705/14 |

FOREIGN PATENT DOCUMENTS

| | | |
|---|---|---|
| JP | 11-353319 | 12/1999 |
| KR | 10-2006-0052978 | 5/2006 |
| KR | 10-2006-0103036 | 9/2006 |
| KR | 10-2007-0029967 | 3/2007 |

OTHER PUBLICATIONS

"Search engine optimisation: A primer on keyword strategies", Ralph F. Wilson and James B. Pettijohn, dated Jul. 10, 2006. ProQuest retrieved.*
Internet magazine, published on Nov. 1, 2003, No. 106, pp. 114-119.
Journal, Using Priorities of Ingredients for Interactive Cooking Recipe Search, published on May 11, 2007, vol. 2007, No. 41, pp. 51-57.
IBM AIX Office Search/6000, 2nd edition, High-performance feature function manipulation guide for a user, Japan, I.B.M. Incorporation, Sep. 30, 1995, pp. 16-44.

* cited by examiner

*Primary Examiner* — Hai Tran
(74) *Attorney, Agent, or Firm* — H.C. Park & Associates, PLC (57) ABSTRACT

A method of recommending an advertisement keyword comprises receiving at least one keyword for an online advertisement from an advertiser; allowing the advertiser to select at least one standard for keyword suggestions associated with the advertisement; selecting at least one keyword suggestions based, at least in part, upon the at least one standard for keyword suggestions; and providing at least some of the selected at least one keyword suggestions.

17 Claims, 5 Drawing Sheets

METHOD AND SYSTEM FOR RECOMMENDING ADVERTISEMENT KEYWORD ACCORDING TO KEYWORD RECOMMENDATION STANDARD

CROSS-REFERENCE TO RELATED APPLICATION

This application claims the benefit of Korean Patent Application No. 10-2007-0040788, filed on Apr. 26, 2007, in the Korean Intellectual Property Office, the disclosure of which is incorporated herein by reference.

BACKGROUND OF THE INVENTION

1. Field of the Invention

The present invention relates to a method and system for recommending an advertisement keyword, and more particularly, to a method and system for recommending an advertisement keyword which receives a selection on a keyword recommendation standard for recommending an advertisement keyword from an advertiser, and recommends an extended advertisement keyword according to the keyword recommendation standard.

2. Description of Related Art

Generally, a method of recommending an advertisement keyword recommends an advertisement keyword corresponding to an advertising product that an advertiser desires to advertise. For example, in a conventional art, when an advertiser desires to advertise a 'Nike' product, a method of recommending an advertisement keyword recommends 'Nike' as an advertisement keyword.

That is, in a method of recommending an advertisement keyword in the conventional art, an advertisement keyword is limited to an advertisement keyword corresponding to an advertising product, and thus various advertisement keywords may not be recommended.

In a method of recommending an advertisement keyword in the conventional art, when an advertisement keyword matching a keyword inputted by an advertiser does not exist, an advertisement keyword may not be recommended. Accordingly, an advertisement keyword that an advertiser desires may not be appropriately recommended.

Thus, a method for controlling a keyword recommendation standard where an advertiser may be provided with an advertisement keyword suitable for the advertiser is required.

BRIEF SUMMARY OF THE INVENTION

The present invention provides a method and system for recommending an advertisement keyword which receives a selection on a keyword recommendation standard for recommending an advertisement keyword from an advertiser, and recommends an extended advertisement keyword according to the keyword recommendation standard.

The present invention also provides a method and system for recommending an advertisement keyword which orders related keywords based on a keyword recommendation standard selected by an advertiser, and recommends an extended advertisement keyword.

The present invention also provides a method and system for recommending an advertisement keyword which, when a keyword recommendation standard selected by an advertiser is a Pay Per Click (PPC) of an advertisement, recommends an extended advertisement keyword based on the PPC of the advertisement.

The present invention also provides a method and system for recommending an advertisement keyword which recommends an extended advertisement keyword based on a number of queries using a keyword of an advertisement, when a keyword recommendation standard selected by an advertiser is the number of queries using the keyword of the advertisement.

The present invention also provides a method and system for recommending an advertisement keyword which recommends an extended advertisement keyword based on a monthly sales forecast with respect to a number of advertisement exposures, when a keyword recommendation standard selected by an advertiser is the monthly sales forecast with respect to the number of advertisement exposures.

The present invention also provides a method and system for recommending an advertisement keyword which recommends an extended advertisement keyword based on a Click Through Rate (CTR), when a keyword recommendation standard selected by an advertiser is the CTR.

The present invention also provides a method and system for recommending an advertisement keyword which recommends a keyword with a less highly-related keyword recommendation standard from among highly-related keywords as an extended advertisement keyword, when a set value with respect to a keyword recommendation standard selected by an advertiser is lowered.

The present invention also provides a method and system for recommending an advertisement keyword which recommends a tail keyword as an extended advertisement keyword, when a set value with respect to a keyword recommendation standard selected by an advertiser is lowered.

According to an aspect of the present invention, the method comprises the steps of: receiving at least one keyword for an online advertisement from an advertiser; allowing the advertiser to select at least one standard for keyword suggestions associated with the advertisement; selecting at least one keyword suggestions based, at least in part, upon the at least one standard for keyword suggestions; and providing at least some of the selected at least one keyword suggestions. The keyword suggestions can be a keyword phrase, such as a tail keyword.

According to another aspect of the present invention, the system comprises: an input component configured for receiving at least one keyword for an online advertisement from an advertiser; a user interface configured for allowing the advertiser to select at least one standard for keyword suggestions associated with the advertisement; a selection component configured for selecting at least one keyword suggestions based, at least in part, upon the at least one standard for keyword suggestions; and a recommendation component configured for providing at least some of the selected at least one keyword suggestions.

The user interface allows the advertiser to control the number of keyword suggestions by using a graphical user interface.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Figure 1:
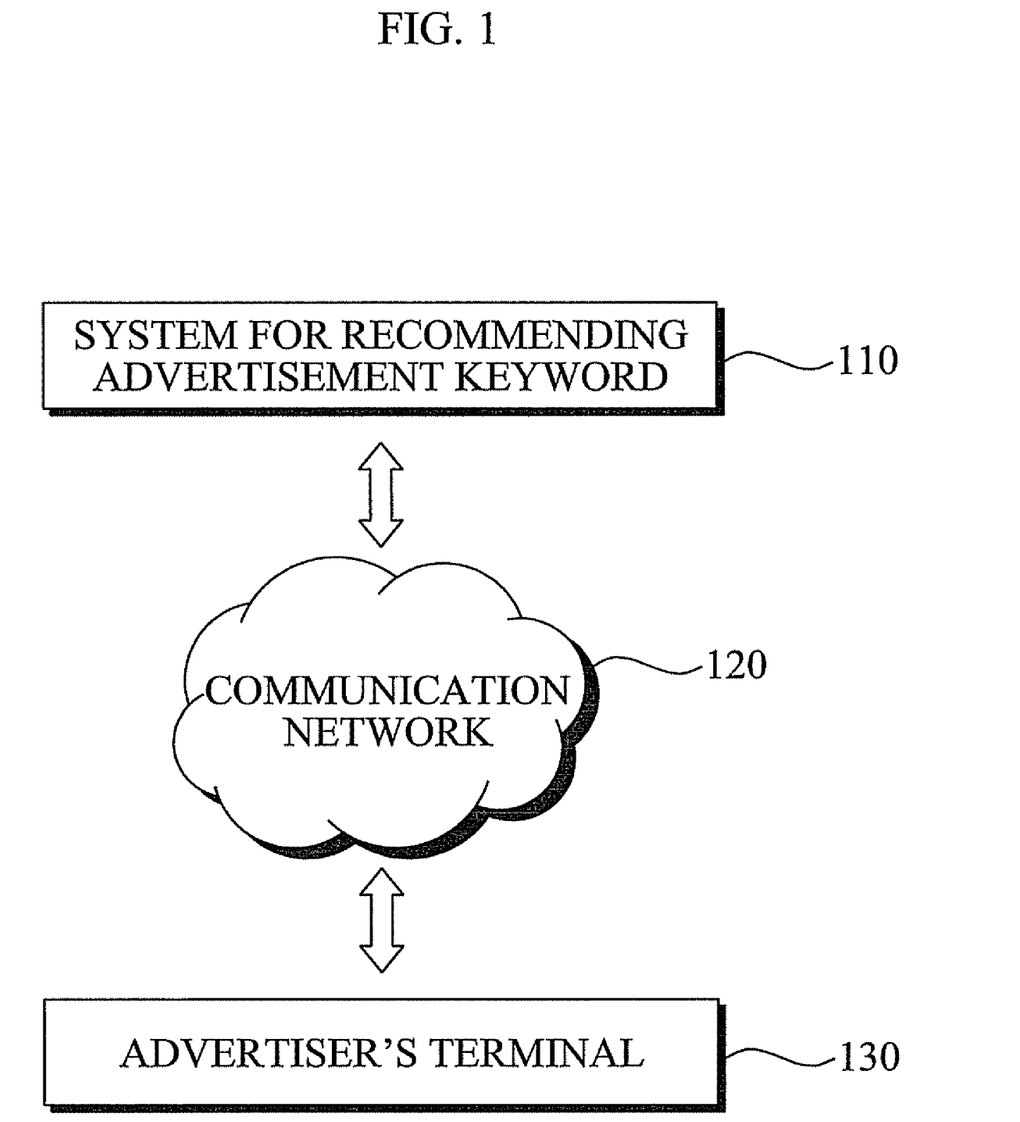
FIG. 1 is a diagram illustrating a relationship between a system for recommending an advertisement keyword and an advertiser's terminal according to an exemplary embodiment of the present invention.

FIG. 1 is a diagram illustrating a relationship between a system 110 for recommending an advertisement keyword and an advertiser's terminal 130 according to an exemplary embodiment of the present invention.

Referring to FIG. 1, the system 110 for recommending an advertisement keyword receives a keyword from the advertiser's terminal 130 connected via a communication network 120. The keyword is inputted by an advertiser. Also, the system 110 for recommending an advertisement keyword receives a keyword recommendation standard from the advertiser's terminal 130 via the communication network 120. The keyword recommendation standard is inputted by the advertiser. The keyword recommendation standard includes a variety of conditions such as a Pay Per Click (PPC) of an advertisement, a number of queries using the keyword, Click Through Rate (CTR), or monthly sales forecast with respect to a number of advertisement exposures.

The system 110 for recommending an advertisement keyword recommends an extended advertisement keyword with respect to the keyword according to the keyword recommendation standard. The extended advertisement keyword is an advertisement keyword which may be recommended according to a set value of the keyword recommendation standard from among related keywords, after ordering the related keywords associated with the keyword according to the keyword recommendation standard.

In one embodiment, when the keyword recommendation standard is the PPC of the advertisement, the system 110 for recommending an advertisement keyword orders related keywords associated with a keyword based on the PPC, and recommend an extended advertisement keyword according to a set value of the PPC from among the related keywords.

In another embodiment, when the keyword recommendation standard is the number of queries using the keyword, the system 110 for recommending an advertisement keyword orders related keywords associated with a keyword based on the number of queries using the keyword, and recommend an extended advertisement keyword according to a set value based on the number of queries using the keyword from among the related keywords.

In further embodiment, when the keyword recommendation standard is the CTR of the advertisement, the system 110 for recommending an advertisement keyword orders related keywords associated with a keyword based on the CTR, and recommend an extended advertisement keyword according to a set value based on the CTR from among the related keywords.

In further embodiment, when the keyword recommendation standard is the monthly sales forecast with respect to the number of advertisement exposures of the advertisement, the system 110 for recommending an advertisement keyword orders related keywords associated with a keyword based on the monthly sales forecast with respect to the number of advertisement exposures, and recommend an extended advertisement keyword according to a set value based on the monthly sales forecast with respect to the number of advertisement exposures from among the related keywords.

The advertiser's terminal 130 is provided with the recommend advertisement keyword from the system 110 for recommending an advertisement keyword. The system 110 for recommending an advertisement keyword is connected via the communication network 120.

As described above, the system 110 for recommending an advertisement keyword receives, from the advertiser, a selection on the keyword recommendation standard for recommending the advertisement keyword, and recommend the extended advertisement keyword according to the keyword recommendation standard.

Figure 2:
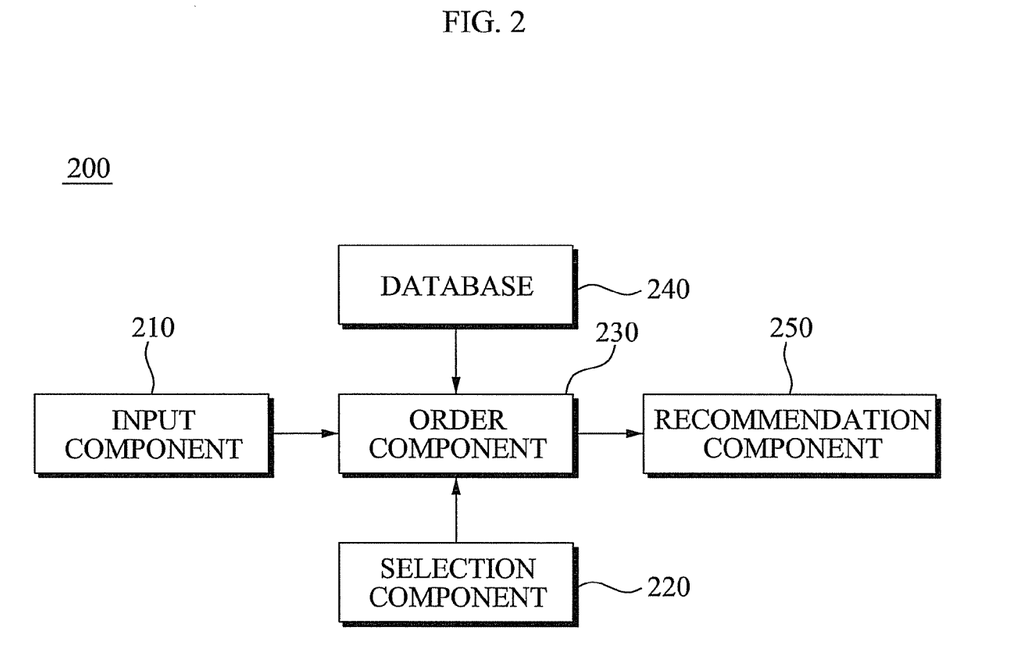
FIG. 2 is a block diagram illustrating a configuration of a system for recommending an advertisement keyword according to an exemplary embodiment of the present invention.

FIG. 2 is a block diagram illustrating a configuration of a system 200 for recommending an advertisement keyword according to an exemplary embodiment of the present invention.

Referring to FIG. 2, the system 200 for recommending an advertisement keyword includes an input component 210, a selection component 220, an order component 230, a database 240, and a recommendation component 250.

The input component 210 receives a keyword from an advertiser. Specifically, the input component 210 receives the keyword associated with an advertising product that the advertiser desires to advertise, from the advertiser. For example, when the advertising product is 'Nike', the input component 210 receives a keyword of 'Nike' from the advertiser.

The selection component 220 receives a selection on a keyword recommendation standard from the advertiser. The selection component 220 receives, from the advertiser, a selection on the keyword recommendation standard such as a PPC, a number of queries using the keyword, a CTR, a monthly sales forecast with respect to a number of advertisement exposures, and the like. In one embodiment, the selection component 220 receives, from the advertiser, a selection on the PPC of the advertisement as the keyword recommendation standard. In another embodiment, the selection component 220 receives, from the advertiser, a selection on the number of queries using the keyword as the keyword recommendation standard. In further embodiment, the selection component 220 receives, from the advertiser, a selection on the CTR as the keyword recommendation standard. In further embodiment, the selection component 220 receives, from the advertiser, a selection on the monthly sales forecast with respect to the number of advertisement exposures as the keyword recommendation standard. Also, the selection component 220 receives a selection on an increase or decrease of the keyword recommendation standard through controlling of a control bar 320 and 420 illustrated in FIGS. 3 and 4. The control bar 320 and 420 is for controlling the keyword recommendation standard, and is controlled by the advertiser.

The order component 230 orders related keywords associated with the keyword according to the keyword recommendation standard. Specifically, the order component 230 orders the related keywords associated with the keyword, stored in the database 240, according to the keyword recommendation standard. In one embodiment, when the keyword recommendation standard is the PPC of the advertisement, the order component 230 orders related keywords associated with a keyword based on the PPC of the advertisement by referring to the database 240. In another embodiment, when the keyword recommendation standard is the number of queries using the keyword, the order component 230 orders related keywords associated with a keyword based on the number of queries using the keyword by referring to the database 240. In further embodiment, when the keyword recommendation standard is the CTR, the order component 230 orders related keywords associated with a keyword based on the CTR by referring to the database 240. In further embodiment, when the keyword recommendation standard is the monthly sales forecast with respect to the number of advertisement exposures, the order component 230 orders related keywords associated with a keyword based on the monthly sales forecast with respect to the number of advertisement exposures by referring to the database 240.

The database 240 stores and maintains data for recommending the advertisement keyword, such as the keyword of the advertisement that the advertiser desires to advertise and the related keywords.

The recommendation component 250 recommends an extended advertisement keyword according to the keyword recommendation standard. In one embodiment, when the keyword recommendation standard is the PPC of the advertisement, the recommendation component 250 recommends an extended advertisement keyword based on the PPC of the advertisement. In further embodiment, when the keyword recommendation standard is the number of queries using the keyword, the recommendation component 250 recommends an extended advertisement keyword based on the number of queries using the keyword. In further embodiment, when the keyword recommendation standard is the CTR, the recommendation component 250 recommends an extended advertisement keyword based on the CTR. In further embodiment, when the keyword recommendation standard is the monthly sales forecast with respect to the number of advertisement exposures, the recommendation component 250 recommends an extended advertisement keyword based on the monthly sales forecast with respect to the number of advertisement exposures. Also, the recommendation component 250 recommends a keyword, selected based on a set value of the keyword recommendation standard from among the ordered related keywords, as the extended advertisement keyword.

As described above, the system 200 for recommending an advertisement keyword receives, from the advertiser, a selection on the keyword recommendation standard for recommending the advertisement keyword, and recommend the extended advertisement keyword according to the keyword recommendation standard.

Figure 3:
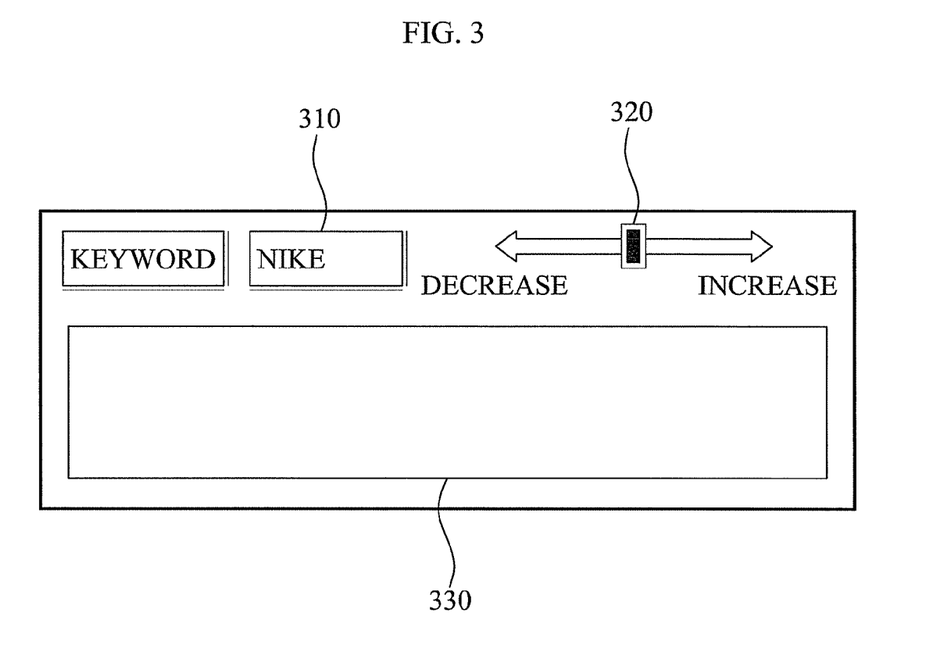
FIG. 3 is a diagram illustrating an example of a screen for selecting a keyword recommendation standard to recommend an advertisement keyword according to an exemplary embodiment of the present invention.

FIG. 3 is a diagram illustrating an example of a screen for selecting a keyword recommendation standard to recommend an advertisement keyword according to an exemplary embodiment of the present invention.

Referring to FIG. 3, a keyword of 'Nike' 310 is an example of when 'Nike' is inputted by an advertiser as a keyword. The system 200 comprises a user interface configured for allowing the advertiser to select at least one standard for keyword suggestions associated with the advertisement. The user interface allows the advertiser to control the number of keyword suggestions by using a graphical user interface, such as a control bar 320. The control bar 320 is for controlling a keyword recommendation standard. A screen 330 is an example of screen providing a recommendation result of an extended advertisement keyword according to the keyword recommendation standard.

An input component 210 receives the keyword of 'Nike' 310 from the advertiser. A selection component 220 receives a selection on the keyword recommendation standard through controlling of the control bar 320. The control bar 320 is for controlling the keyword recommendation standard and is controlled by the advertiser. In this instance, the control bar 320 is moved by the advertiser to increase or decrease the keyword recommendation standard. For example, when the keyword recommendation standard is a PPC of an advertisement, a recommendation component 250 recommends an extended advertisement keyword based on the PPC, which is controlled through the control bar 320, via the screen 330 providing the recommendation result.

Figure 4:
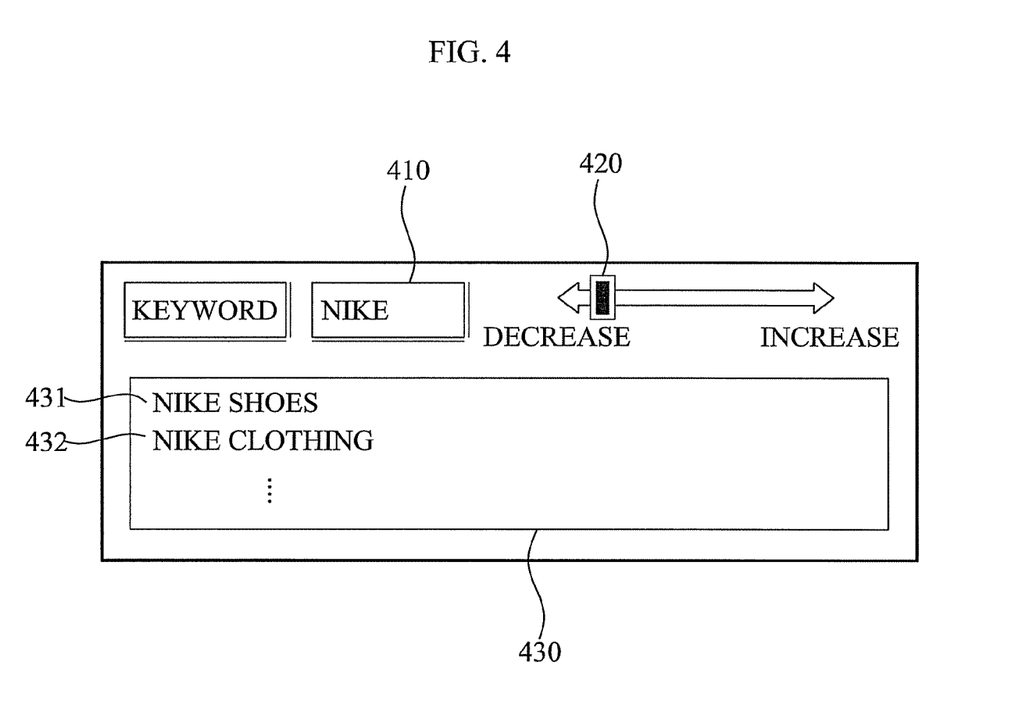
FIG. 4 is a diagram illustrating an example of an advertisement keyword recommended according to a keyword recommendation standard according to an exemplary embodiment of the present invention.

FIG. 4 is a diagram illustrating an example of an advertisement keyword recommended according to a keyword recommendation standard according to an exemplary embodiment of the present invention.

Referring to FIG. 4, a keyword of 'Nike' 410 is an example of when 'Nike' is inputted by an advertiser. A control bar 420 moves to decrease the keyword recommendation standard. The control bar 420 is for controlling the keyword recommendation standard. A screen 430 is an example of a screen providing a recommendation result of an extended advertisement keyword according to the keyword recommendation standard decreased through the control bar 420.

In one embodiment, when the advertiser moves the control bar 420 to decrease a PPC of the advertisement, a recommendation component 250 recommends an advertisement keyword with a low PPC of the advertisement from among advertisement keywords highly associated with the keyword of 'Nike' 410. Specifically, when the advertiser moves the control bar 420 to decrease the PPC of the advertisement, the recommendation component 250 recommends a tail keyword such as 'Nike shoes' 431, 'Nike clothing' 432, and the like as the extended advertisement keyword via the screen 430. The tail keyword is an example of a related keyword, and a keyword made by combining the keyword, inputted by the advertiser, and a word, associated with the inputted keyword, behind the inputted keyword.

Figure 5:
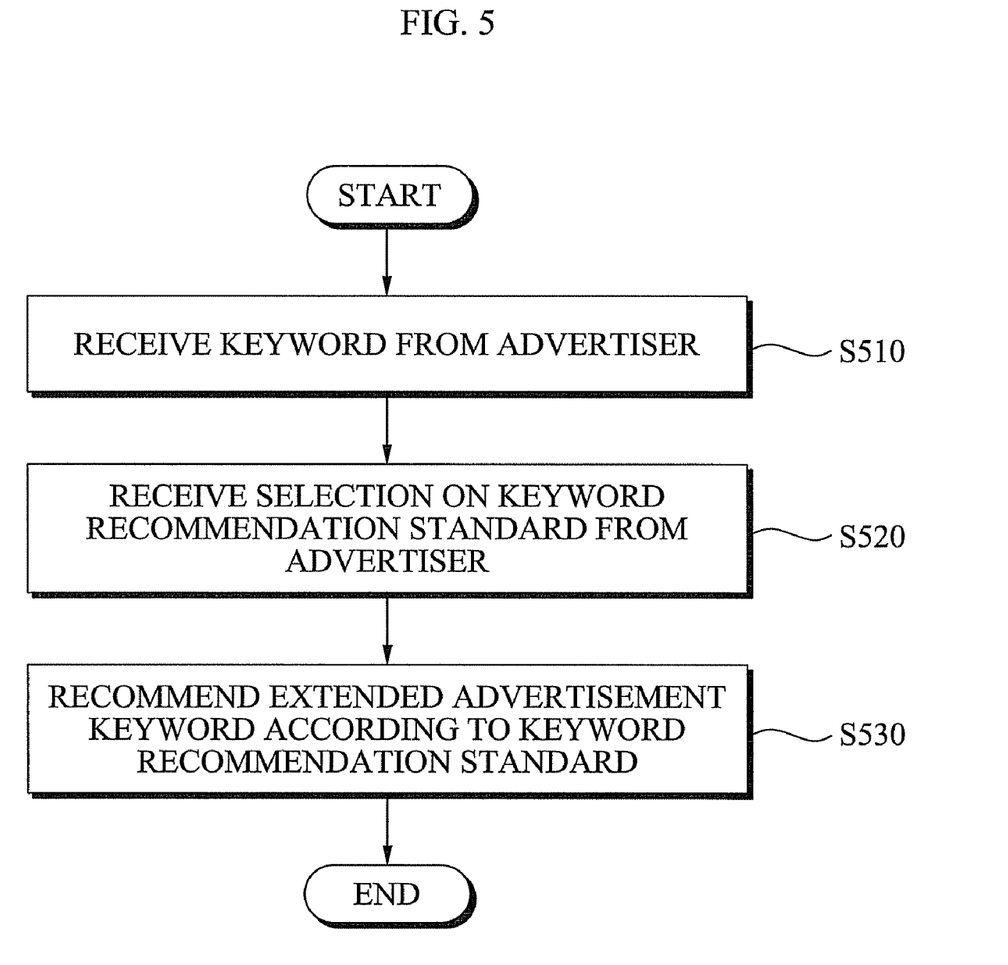
FIG. 5 is a flowchart illustrating a method of recommending an advertisement keyword according to an exemplary embodiment of the present invention.

FIG. 5 is a flowchart illustrating a method of recommending an advertisement keyword according to exemplary embodiment of the present invention.

Referring to FIG. 5, in operation S510, a system for recommending an advertisement keyword receives a keyword from an advertiser. Specifically, in operation S510, the system for recommending an advertisement keyword receives the keyword of an advertising product that the advertiser desires to advertise from the advertiser. For example, when a representation keyword of the advertising product is 'Nike', the system for recommending an advertisement keyword receives a keyword of 'Nike' as the keyword from the advertiser as illustrated in FIGS. 3 and 4.

In operation S520, the system for recommending an advertisement keyword receives a selection on a keyword recommendation standard from the advertiser. Specifically, in operation S520, the system for recommending an advertisement keyword receives, from the advertiser, a selection on the keyword recommendation standard such as a PPC of an advertisement, a number of queries using the keyword, a CTR, a monthly sales forecast with respect to a number of advertisement exposures, and the like.

In one embodiment, when the keyword recommendation standard is the PPC of the advertisement, the system for recommending an advertisement keyword receives, from the advertiser, a selection on the PPC of the advertisement as the keyword recommendation standard in operation S520. The PPC of the advertisement is set by the advertiser in order to control the frequency of exposing advertisements based on the PPC to decrease or increase.

In further embodiment, when the keyword recommendation standard is the number of queries using the keyword, the system for recommending an advertisement keyword receives, from the advertiser, a selection on the number of queries using the keyword as the keyword recommendation standard in operation S520. The number of queries using the keyword is set by the advertiser in order to control the number of queries using the keyword to decrease or increase.

In further embodiment, when the keyword recommendation standard is the CTR, the system for recommending an advertisement keyword receives, from the advertiser, a selection on the CTR as the keyword recommendation standard in operation S520. The CTR is set by the advertiser in order to control the CTR to decrease or increase.

In further embodiment, when the keyword recommendation standard is the monthly sales forecast with respect to the number of advertisement exposures, the system for recommending an advertisement keyword receives, from the advertiser, a selection on the monthly sales forecast with respect to the number of advertisement exposures as the keyword recommendation standard in operation S520. The monthly sales forecast with respect to the number of advertisement exposures is set by the advertiser in order to control the monthly sales forecast with respect to the number of advertisement exposures to decrease or increase.

Also, in operation S520, the system for recommending an advertisement keyword receives a selection on an increase or decrease of the keyword recommendation standard through controlling of a control bar 320 and 420 as illustrated in FIGS. 3 and 4. The control bar 320 and 420 is for controlling the keyword recommendation standard and is controlled by the advertiser.

As described above, the method of recommending an advertisement keyword receives a selection on a variety of keyword recommendation standards from the advertiser.

In operation S530, the system for recommending an advertisement keyword recommends an extended advertisement keyword according to the keyword recommendation standard. Specifically, in operation S530, the system for recommending an advertisement keyword recommends an extended advertisement keyword corresponding to the inputted keyword based on the keyword recommendation standard.

In one embodiment, when the keyword recommendation standard is the PPC of the advertisement, the system for recommending an advertisement keyword recommends an extended advertisement keyword based on the PPC of the advertisement in operation S530.

In further embodiment, when the keyword recommendation standard is the number of queries using the keyword, the system for recommending an advertisement keyword recommends an extended advertisement keyword based on the number of queries using the keyword in operation S530.

In further embodiment, when the keyword recommendation standard is the CTR, the system for recommending an advertisement keyword recommends an extended advertisement keyword based on the CTR in operation S530.

In further embodiment, when the keyword recommendation standard is the monthly sales forecast with respect to the number of advertisement exposures, the system for recommending an advertisement keyword recommends an extended advertisement keyword based on the monthly sales forecast with respect to the number of advertisement exposures in operation S530.

In further embodiment, when a set value of the keyword recommendation standard, selected by the advertiser, is lowered, the system for recommending an advertisement keyword recommends a tail keyword as the extended advertisement keyword in operation S530.

As described above, the method of recommending an advertisement keyword receives, from the advertiser, a selection on the keyword recommendation standard for recommending the advertisement keyword, and recommend the extended advertisement keyword according to the keyword recommendation standard.

Figure 6:
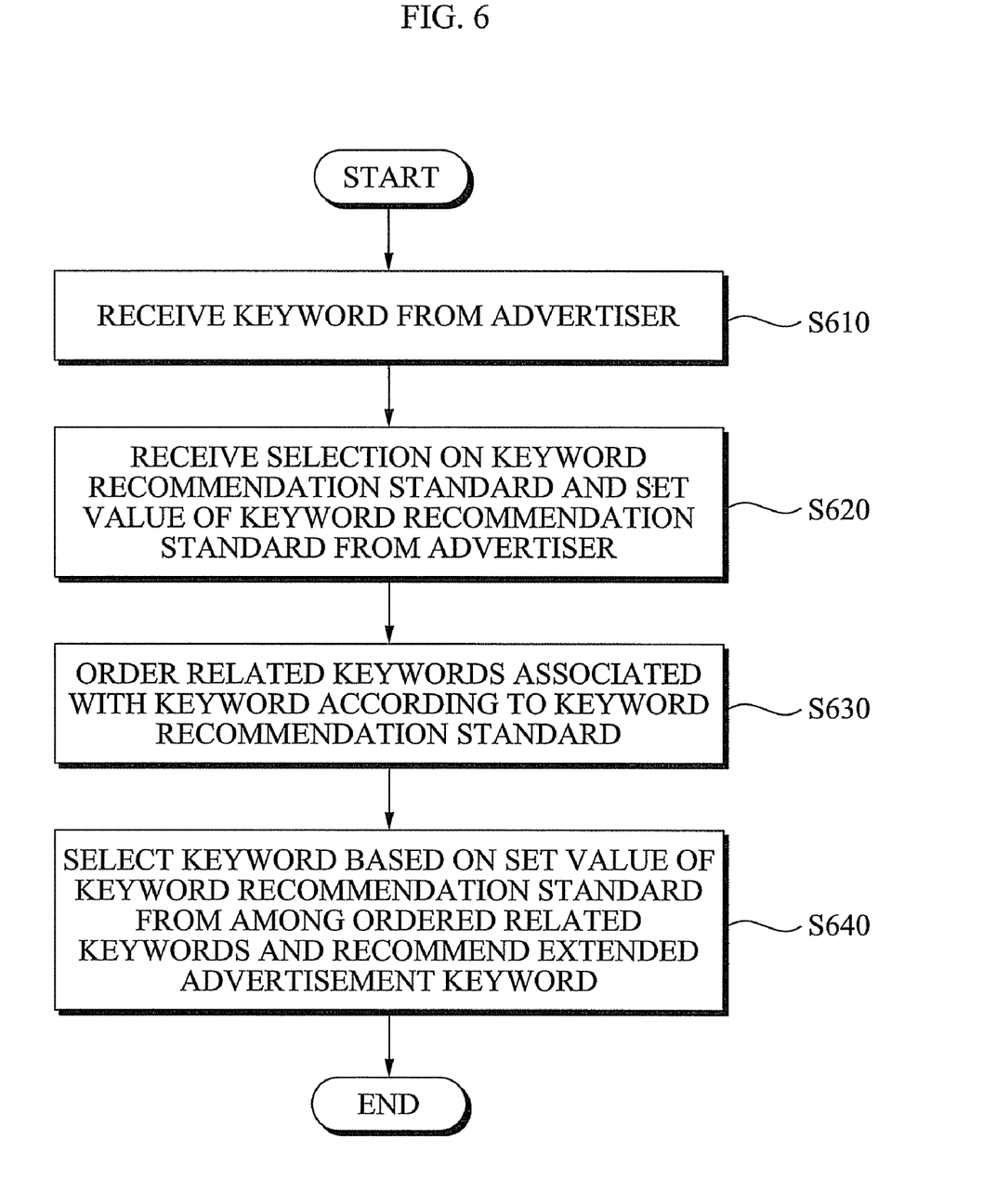
FIG. 6 is a flowchart illustrating a method of recommending an advertisement keyword according to another exemplary embodiment of the present invention.

FIG. 6 is a flowchart illustrating a method of recommending an advertisement keyword according to another exemplary embodiment of the present invention.

Referring to FIG. 6, in operation S610, a system for recommending an advertisement keyword receives a keyword from an advertiser. Specifically, in operation S610, the system for recommending an advertisement keyword receives the keyword of an advertising product that the advertiser desires to advertise from the advertiser. For example, when a representative keyword of the advertising product is 'Nike', the system for recommending an advertisement keyword receives a keyword of 'Nike' as the keyword from the advertiser as illustrated in FIGS. 3 and 4.

In operation S620, the system for recommending an advertisement keyword receives, from the advertiser, a selection on a keyword recommendation standard and a set value of the keyword recommendation standard. Specifically, in operation S620, the system for recommending an advertisement keyword receives, from the advertiser, a selection on the keyword recommendation standard and the set value of the keyword recommendation standard such as a PPC of an advertisement, a number of queries using the keyword, a CTR, a monthly sales forecast with respect to a number of advertisement exposures, and the like.

For example, in operation S620, the system for recommending an advertisement keyword receives, from the advertiser, a selection on the PPC of the advertisement as the keyword recommendation standard. Also, the system for recommending an advertisement keyword receives, from the advertiser, a selection on a set value of the keyword recommendation standard through controlling of the PPC of the advertisement. The advertiser controls the PPC of the advertisement to increase or decrease.

For another example, in operation S620, the system for recommending an advertisement keyword receives, from the advertiser, a selection on the number of queries using the keyword as the keyword recommendation standard. Also, the system for recommending an advertisement keyword receives, from the advertiser, a selection on a set value of the keyword recommendation standard through controlling of the number of queries using the keyword. The advertiser controls the number of queries using the keyword to increase or decrease.

For another example, in operation S620, the system for recommending an advertisement keyword receives, from the advertiser, a selection on the CTR as the keyword recommendation standard. Also, the system for recommending an advertisement keyword receives, from the advertiser, a selection on a set value of the keyword recommendation standard through controlling of the CTR. The advertiser controls the CTR to increase or decrease.

For another example, in operation S620, the system for recommending an advertisement keyword receives, from the advertiser, a selection on the monthly sales forecast with respect to a number of advertisement exposures as the keyword recommendation standard. Also, the system for recommending an advertisement keyword receives, from the advertiser, a selection on a set value of the keyword recommendation standard through controlling of the monthly sales forecast with respect to a number of advertisement exposures. The advertiser controls the monthly sales forecast with respect to a number of advertisement exposures to increase or decrease.

In operation S620, the system for recommending an advertisement keyword receives, from the advertiser, a selection on the set value to increase or decrease the keyword recommendation standard through controlling of a control bar 320 and 420 as illustrated in FIGS. 3 and 4. The control bar 320 and 420 is for controlling the keyword recommendation standard and is controlled by the advertiser.

In operation S630, the system for recommending an advertisement keyword orders related keywords associated with the keyword according to the keyword recommendation standard. Specifically, in operation S630, the system for recommending an advertisement keyword orders the related keywords, associated with the keyword inputted by the advertiser, according to the keyword recommendation standard.

For example, when the keyword recommendation standard is the PPC of the advertisement, the system for recommending an advertisement keyword orders related keywords, associated with the keyword inputted by the advertiser, according to the PPC of the advertisement in operation S630.

For another example, when the keyword recommendation standard is the number of queries using the keyword, the system for recommending an advertisement keyword orders related keywords, associated with the keyword inputted by the advertiser, according to the number of queries using the keyword in operation S630.

For still another example, when the keyword recommendation standard is the CTR, the system for recommending an advertisement keyword orders related keywords, associated with the keyword inputted by the advertiser, according to the CTR in operation S630.

For yet another example, when the keyword recommendation standard is the monthly sales forecast with respect to the number of advertisement exposures, the system for recommending an advertisement keyword orders related keywords, associated with the keyword inputted by the advertiser, according to the monthly sales forecast with respect to the number of advertisement exposures in operation S630.

In operation S640, the system for recommending an advertisement keyword selects a keyword based on the set value of the keyword recommendation standard from among the ordered related keywords, and recommends the selected keyword as an extended advertisement keyword.

For example, when the keyword recommendation standard is the PPC of the advertisement, the system for recommending an advertisement keyword selects a keyword based on a get value of the PPC of the advertisement from among the ordered related keywords, and recommend the selected keyword as the extended advertisement keyword in operation S640.

For another example, when the keyword recommendation standard is the number of queries using the keyword, the system for recommending an advertisement keyword selects a keyword based on a set value of the number of queries using the keyword from among the ordered related keywords, and recommend the selected keyword as the extended advertisement keyword in operation S640.

For still another example, when the keyword recommendation standard is the CTR, the system for recommending an advertisement keyword selects a keyword based on a set value of the CTR from among the ordered related keywords, and recommend the selected keyword as the extended advertisement keyword in operation S640.

For yet another example, when the keyword recommendation standard is the monthly sales forecast with respect to the number of advertisement exposures, the system for recommending an advertisement keyword selects a keyword based on a set value of the monthly sales forecast with respect to the number of advertisement exposures from among the ordered related keywords, and recommend the selected keyword as the extended advertisement keyword in operation S640.

For a further example, when the set value of the keyword recommendation standard, selected by the advertiser, is lowered, the system for recommending an advertisement keyword recommends a keyword with a low less highly-related keyword recommendation standard from among highly-related keywords as the extended advertisement keyword.

As described above, according to the present invention, the system for recommending an advertisement keyword receives, from the advertiser, a selection on the keyword recommendation standard and the set value of the keyword recommendation standard, select the keyword based on the set value of the keyword recommendation standard from among the related keywords ordered according to the keyword recommendation standard, and recommend the selected keyword as the extended advertisement keyword.

The exemplary embodiments of the present invention may be recorded in computer-readable media including program instructions to implement various operations embodied by a computer. The media also includes, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, a method and system for recommending an advertisement keyword receives a selection on a keyword recommendation standard for recommending an advertisement keyword from an advertiser, and recommends an extended advertisement keyword according to the keyword recommendation standard.

Also, according to the present invention, a method and system for recommending an advertisement keyword orders related keywords based on a keyword recommendation standard selected by an advertiser, and recommends an extended advertisement keyword.

Also, according to the present invention, a method and system for recommending an advertisement keyword recommends an extended advertisement keyword based on a PPC of the advertisement, when a keyword recommendation standard selected by an advertiser is the PPC of an advertisement.

Also, according to the present invention, a method and system for recommending an advertisement keyword recommends an extended advertisement keyword based on a number of queries using a keyword of an advertisement, when a keyword recommendation standard selected by an advertiser is the number of queries using the keyword of the advertisement.

Also, according to the present invention, a method and system for recommending an advertisement keyword recommends an extended advertisement keyword based on a monthly sales forecast with respect to a number of advertisement exposures, when a keyword recommendation standard selected by an advertiser is the monthly sales forecast with respect to the number of advertisement exposures.

Also, according to the present invention, a method and system for recommending an advertisement keyword recommends an extended advertisement keyword based on a CTR, when a keyword recommendation standard selected by an advertiser is the CTR.

Also, according to the present invention, a method and system for recommending an advertisement keyword recommends a keyword with a less highly-related keyword recommendation standard from among highly-related keywords as an extended advertisement keyword, when a set value with respect to a keyword recommendation standard selected by an advertiser is lowered.

Also, according to the present invention, a method and system for recommending an advertisement keyword recommends a tail keyword as an extended advertisement keyword, when a set value with respect to a keyword recommendation standard selected by an advertiser is lowered.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer-implemented method, using a processor of a server, for recommending an advertisement keyword, the method comprising:
   receiving an advertisement keyword from an advertiser;
   providing, by the processor, a keyword recommendation standard comprising one or more conditions for advertising an extended advertisement keyword in response to detection of the advertisement keyword;
   allowing the advertiser to select the one or more conditions of the keyword recommendation standard by using a user interface, a value of the respective conditions of the keyword recommendation standard being adjustably controlled in response to receipt of increasing or decreasing the value of the selected conditions by using the user interface;
   ordering, by the processor, related keywords associated with the advertisement keyword according to the selection of the keyword recommendation standard; and
   providing the extended advertisement keyword according to the value of the selected conditions from among the related keywords,
   wherein the advertiser is allowed to control the user interface to increase or decrease the value of the respective conditions, and the one or more conditions comprises at least one of a Pay Per Click (PPC), a number of times a keyword is queried, a Click Through Rate (CTR), and a monthly sales estimate with respect to a number of advertisement exposures.

2. The method of claim 1, further comprising:
   displaying a number of times of the extended advertisement keyword, wherein the value is set by the advertiser using the interface.

3. The method of claim 1, further comprising:
   providing a graphical user interface to control a number of times of the extended advertisement keyword.

4. The method of claim 1, wherein providing the extended advertisement keyword comprises providing a head keyword, a tail keyword, or both of the head keyword and the tail keyword corresponding to the received advertisement keyword according to the selected one or more of the conditions and adjustably controlled value.

5. One or more non-transitory computer-readable media comprising an executable computer program, which when executed by one or more processors, causes the one or more processors to perform steps of:
   receiving one or more advertisement keywords from an advertiser; and
   providing a keyword recommendation standard comprising one or more conditions for advertising an extended advertisement keyword,
   wherein the extended advertisement keyword is provided according to the one or more conditions of the keyword recommendation standard, and wherein the one or more conditions of the keyword recommendation standard is selected and adjustably controlled by an interface in response to detection of increasing or decreasing a value with respect to the selected conditions by using the interface.

6. A system comprising a server for recommending an advertisement keyword, the system comprising:
   an input component coupled to a processor of the server and configured to receive an advertisement keyword from a user;
   a user interface configured to adjust a keyword recommendation standard to selectively provide a recommended advertisement keyword according to one or more conditions of the recommendation standard;
   a selection component, coupled to the processor, configured to select the one or more conditions and a value which adjustably control the one or more conditions of the keyword recommendation standard to optimize an advertising effect of the advertiser; and
   a recommendation component, coupled to the processor, configured to provide the recommended advertisement keyword according to the one or more conditions being selected and the adjustably controlled value corresponding to each selected condition.

7. The system of claim 6, wherein the one or more conditions comprise a Pay Per Click (PPC).

8. The system of claim 6, wherein the one or more conditions comprise a number of times a keyword is clicked.

9. The system of claim 6, wherein the one or more conditions comprise a Click Through Rate (CTR).

10. The system of claim 6, wherein the one or more conditions comprise a monthly sales estimates with respect to a number of advertisement exposures.

11. The system of claim 6, wherein the recommendation component is configured to display a number of recommended advertisement keywords and the interface is configured to allow the advertiser to control the one or more conditions and the value associated with the recommended advertisement keyword.

12. The system of claim 6, wherein the recommendation component is configured to control a number of recommended advertisement keywords by providing a graphical user interface.

13. The system of claim 6, wherein the recommended advertisement keyword comprises a tail keyword of the received advertisement keyword.

14. An apparatus comprising:
   a processor of a server configured to provide an extended advertisement keyword associated with optimizing an advertising an advertisement keyword received from an advertiser according to a selectable advertising criteria of a recommendation standard comprising one of a Pay Per Click (PPC), a number of queries associated with clicking a keyword, Click Through Rate (CTR), a periodic sale volume estimates or any combination thereof associated with an adjustable value corresponding to the selectable advertising criteria, wherein an interface is provided to select one or more of the selectable advertising criteria and to control the adjustable value in response to receipt of increasing or decreasing the adjustable value of the one or more selected criteria by using the interface.

15. The apparatus of claim 14, wherein the extended advertisement keyword comprises a head keyword, a tail keyword, or both of the head keyword and the tail keyword corresponding to the advertisement keyword.

16. The apparatus of claim 15, further comprising:
   a database coupled to the server configured to store the extended advertisement keyword corresponding to the advertisement keyword.

17. The apparatus of claim 15, wherein the extended advertisement keyword is generated by providing the head keyword, the tail keyword, or both the head keyword and the tail keyword of the advertisement keyword according to the selected advertising criteria and the adjusted value corresponding the selected advertising criteria.

* * * * *